2,694,060

PROCESS OF BLEACHING CELLULOSE ESTERS WITH CHLORITES

Vernon R. Grassie, Landenberg, Pa., assignor to Hercules Powder Company, Wilmington, Del., a corporation of Delaware No Drawing. Application May 17, 1951,
Serial No. 226,932

7 Claims. (Cl. 260—230)

This invention relates to the treatment of cellulose derivatives. In a specific aspect this invention relates to a process for the treatment of cellulose esters. In a more specific aspect this invention relates to a novel process for bleaching cellulose esters for use in plastic compositions requiring a high thermal color stability of the cellulose esters.

Cellulose esters, particularly cellulose acetate, and the like, are employed in high temperature molding of a wide variety of articles, and in some molding operations it is essential that the cellulose ester have a high thermal color stability in order that the product resulting from the molding process will be transparent and colorless. The color of high temperature molded cellulose ester plastics appears to be attributable to several causes, among which are (1) the presence in the plastic of colored contaminants originally contained in the ester flake; (2) thermal decomposition of contaminants under the high temperature molding conditions; and (3) decomposition of the cellulose ester itself due to the presence in the macromolecules of thermally and oxidatively sensitive configurations. Various methods have been employed to bleach cellulose esters in efforts to obtain colorless, transparent plastic articles from these esters. For example, such bleaching agents as potassium permanganate, hydrogen peroxide, sodium hypochlorite, and the like, have been employed heretofore to bleach cellulose esters, but the results obtained with these bleaching agents have not always met the commercial specifications. Consequently, the desirability and necessity for an improved cellulose ester bleaching process is quite evident.

It is an object of this invention to provide a novel process for the treatment of cellulose derivatives.

It is another object of this invention to provide a novel and improved process for the bleaching of cellulose esters.

It is a further object of this invention to provide a novel and improved process for the bleaching of cellulose acetate to improve the thermal color stability of the cellulose acetate.

Further and additional objects of this invention will be readily apparent from the detailed disclosure of the invention.

In accordance with this invention a cellulose ester of high thermal color stability and suitable for use in high temperature molding operations is prepared by bleaching the cellulose ester in the presence of an inorganic chlorite. The bleaching is effected in a water slurry of the cellulose ester at an elevated temperature and at a pH below 7. Although the invention is applicable to cellulose esters generally, the details of the invention will be discussed with respect to cellulose acetate which represents the preferred ester for practicing the invention.

Having described the invention generally, the following examples serve as illustrative methods of effecting the invention.

Four specimens of cellulose acetate were bleached in accordance with this invention. Three of these specimens were prepared by a sulfate-free acetylation technique wherein zinc chloride and perchloric acid are employed as the acetylation catalyst. These three samples are listed in Table 1 as samples A, B, and C. The fourth sample was prepared by a process wherein methylene chloride is used as a solvent and sulfuric acid is employed as a catalyst. This specimen is listed in Table 1 as sample D. In the above processes secondary acetates obtained by the hydrolysis of the triacetate dopes were precipitated in flake form and washed to suitable purity as regards ionic contaminants. These cellulose acetates were characterized by determinations of combined acetic acid content and by intrinsic viscosity measurements. These data are listed in Table 1 below. In order to compare bleached and unbleached specimens of the cellulose acetate, determinations were made of the inherent colors of the cellulose acetates and of the colors of the high temperature molded plastics. The inherent color determination, expressed in Cellulose Products Standard Color Scale (CSCS) units, pertains to the color of a 10.6% solution of the acetate in a 9:1 acetone-ethanol solvent as measured through the 5 cm. dimension of a 5x2x2.3 cm. rectangular optical cell. The molding test is carried out for 15 minutes at 5000 lb. pressure and at 200° C. using an intimately blended mixture of 3 parts of cellulose acetate flake dried for one hour at 105° C. and having a 30–60 mesh particle size and one part of redistilled diethyl phthalate. A shallow cylindrical mold is used giving plastic disks which are 2¼ inches in diameter and 0.18 inch in thickness. Plastic colors are expressed in CSCS units and corrections are applied for disks which deviate from the 0.18 inch dimension. In the color measurements a photometer is used under conditions such as to minimize the influence of plastic or solution haze. The colors obtained in the molding test are a practical measurement of the manner in which the cellulose acetate will behave under use conditions. In interpreting the color values it is necessary to point out that the solution concentration (10.6%) and optical cell dimensions for the inherent color determination are chosen so that there is as much cellulose acetate in the light beam of the measuring instrument as there is when the color of a plastic disk is being determined. Also, since the CSCS color scale is linear, the inherent and plastic colors are directly comparable. The method for this color determination is based on the method devised by the International Commission on Illumination in 1931 and a complete exposition of the method can be found in the Handbook of Colorimetry, The Technology Press, Massachusetts Institute of Technology, Cambridge, Massachusetts, 1936, prepared under the direction of Arthur C. Hardy.

The properties of the cellulose acetate samples that were bleached in accordance with this invention are listed in the following table:

Table 1

CELLULOSE ACETATES FOR BLEACHING

| No. | Cellulose Used | | Acetylation Catalyst | Percent Combined HOAc | D. S.[b] | $[\eta]$ [c] | Inherent Color | Plastics Color |
|---|---|---|---|---|---|---|---|---|
| | Type | Percent $\alpha$ | | | | | | |
| A | Linters | 99.3 | $ZnCl_2$—$HClO_4$ | 55.3 | 2.43 | 1.314 | 3.5 | 9.7 |
| B | do | 99.3 | $ZnCl_2$—$HClO_4$ | 55.5 | 2.45 | 1.329 | 5.7 | 12.0 |
| C | Wood pulp[a] | 95.5 | $ZnCl_2$—$HClO_4$ | 56.4 | 2.51 | 1.479 | 12.1 | 28.5 |
| D | do | 95.4 | $H_2SO_4$ | 56.3 | 2.50 | 1.244 | 10.2 | 21.7 |

[a] Specially refined sulfite wood pulp.
[b] Degree of acetyl substitution.
[c] Intrinsic viscosity in 9:1 acetone:ethanol.

EXAMPLE 1

A portion of linters acetate (A), 100 parts, was suspended in 1200 parts of water (7.7% slurry concentration) and the pH was adjusted to 4.8 by the addition of dilute acetic acid. The mixture was heated to 95° to 100° C. under reflux with continuous mechanical agitation and was treated at this temperature with a solution of 1.435 parts of sodium chlorite in 30 parts of water. Bleaching was carried out for 2 hours at 95° to 100° C., with agitation, and was accompanied by a slight evolution of chlorine dioxide. The bleached acetate particles were drained through a screen fitted in a displacement washer and were washed to pH equilibrium. The material was dried in a current of warm air after draining to approximately 25% solids content. Samples for testing were screened between 30- and 60-mesh particle size and were dried again for 1 hour, using a blower oven, at 105° C. Evaluation: intrinsic viscosity, 1.304; inherent acetate color, 0.3 CSCS; plastics color, 3.0 CSCS.

EXAMPLE 2

A portion of linters acetate (B), 25 parts, was suspended in 300 parts of water (7.7% slurry concentration) and the pH was adjusted to 4.8 by the addition of a suitable amount of acetic acid. Sodium chlorite, 0.359 part dissolved in 10 parts of water was added to the acetate slurry and the mixture was transferred to a screwcapped bottle provided with a gasket of cellulose acetate film. The slurry occupied about 60% of the bottle capacity. The bottle was placed in a stainless steel bomb and the air space remaining was entirely filled with water. The bomb and its contents were heated at 117° C. for 1½ hours with continuous tumbling, and then the acetate particles were separated, washed, and dried in the manner indicated in Example 1. Evaluation: intrinsic viscosity, 1.280; inherent acetate color, 0.3 CSCS; plastics color, 4.4 CSCS.

EXAMPLE 3

A portion of wood pulp acetate (C), was treated exactly as described for the acetate in Example 1. After appropriate washing and drying, the bleached acetate possessed the following characteristics. Evaluation: intrinsic viscosity, 1.431; inherent acetate color, 0.3 CSCS; plastics color, 7.2 CSCS.

EXAMPLE 4

The run was repeated with wood pulp acetate C, as in Example 3, except with the use of 0.478 part of sodium chlorite per 100 parts of material. Evaluation of the bleached acetate: intrinsic viscosity, 1.425; inherent acetate color, 0.4 CSCS; plastics color, 8.4 CSCS.

EXAMPLE 5

A charge of cellulose acetate D, 3000 parts in 18,400 parts of water (14.0% slurry concentration) with pH in the range of 5-6, was heated in a treating tub to 95° C. Sodium chlorite, 6.54 parts (355 parts per million of sodium chlorite in the water), was added to the mixture, and the bleach was carried out for 1 hour at 95° C. The acetate particles were drained and washed in the usual way. Evaluation of the bleached acetate: intrinsic viscosity, 1.167; plastics color, 12.3 CSCS.

The cellulose esters within the scope of this invention are generally water-insoluble. Typical cellulose esters are cellulose acetate, cellulose propionate and cellulose butyrate with cellulose acetate being the preferred ester. Also within the scope of this invention are mixed esters, for example, cellulose acetate propionate and cellulose acetate butyrate. Ether-ester derivatives of cellulose can also be bleached in accordance with this process, but in these ether-ester derivatives the ester grouping is the dominant substituent. For example, it is within the scope of the invention to employ acetylated hydroxyethyl cellulose wherein the acetate is the dominant substituent, and the hydroxyethyl grouping is present only in a minor amount. Throughout the specification and claims the term "cellulose ester" will be employed in the description of the invention. However, it will be understood that this term also includes those ether-ester cellulose derivatives wherein the ester substituent is the dominant substituent. The cellulose esters employed in practicing this invention can be prepared by any of the known methods. A typical method for preparing these cellulose esters will be set forth by describing a method for preparing cellulose acetate. One method of preparing cellulose acetate involves the preparation of a cellulose mix by spraying cotton linters with glacial acetic acid. An acetylation mix is separately prepared by mixing together acetic anhydride, methylene chloride and catalytic amounts of zinc chloride and perchloric acid. This latter mix and the cellulose mix are combined and agitated for a period of time sufficient to effect the desired acetylation. At the end of this period of time the reaction is arrested by the addition of aqueous acetic acid, and the catalyst is then neutralized with aqueous sodium acetate. The methylene chloride is then removed by distillation and aqueous acetic acid is added until a state of incipient pecipitation is reached. Precipitation is then completed by the addition of water and the product is purified by water washing and it is then air dried. Another method of peparing cellulose acetate involves a procedure similar to that described above, but in place of the zinc chloride-perchloric acid catalyst a sulfuric acid catalyst is used. Either of these methods or any other method known for producing cellulose esters is within the scope of this invention.

In practicing this invention the cellulose ester in granular or flake form is suspended in water to form a slurry having a concentration of 7 to 15%. The pH of the slurry is adjusted to within the range of 3 to 6, preferably 4 to 5, by addition to the slurry of an appropriate amount of an acid, preferably acetic acid. The resulting mixture is heated to a temperature within the range of 75° to 130° C. and a pressure sufficient to maintain the water in the liquid phase is employed. The chlorite bleaching agent is then added to the mixture in the form of an aqueous solution, and the bleaching is allowed to proceed for a period of time sufficient to effect the desired bleaching. Ordinarily, the desired bleaching can be effected in a period of 0.5 to 6 hours, preferably from 1 to 3 hours. During this period of time the mixture is agitated to insure adequate contacting of the cellulose ester and the chlorite bleaching agent, and at the end of this period of time the cellulose ester is drained and washed thoroughly with water.

The bleaching process is effected at the highest slurry concentration that permits efficient agitation and mixing and this varies with the type of agitation available for use. In laboratory procedures the slurry concentrations have generally been below 10% and in commercial practice the usual range of slurry concentrations is from 13 to 15%. By slurry concentration is meant the relationship between the amount of cellulose ester and the total amount of cellulose ester and slurrying medium.

The amount of bleaching agent that is employed is variable. The preferred amount is the minimum amount required to provide adequate purification of the cellulose ester. The actual amount of bleaching agent employed is within the range of 0.001 to 0.015 part of bleaching agent per part of cellulose ester. Wood pulp esters require more bleaching than esters of cotton linters. When bleaching wood pulp cellulose esters, the minimum amount of bleaching agent would not effect as good a purification as would be effected on a cotton linters cellulose ester. However, with either type of ester, a bleaching thereof would take place with the minimum amount of bleaching agent. The upper limit or 0.015 part of bleaching agent per part of cellulose ester is sufficient to provide an efficient bleach for cellulose esters of all types in a period of two hours and at a temperature of 95° to 100° C. Greater amounts of bleaching agent can be used, if desired, since the chlorite bleaching agents within the scope of this invention are for all practical purposes incapable of oxidatively damaging the cellulose ester. However, greater amounts of bleaching agent are not necessary for carrying out the process.

In the preferred embodiment the bleaching agent is added to the water slurry of the cellulose ester in an aqueous solution. This solution usually has a concentration of bleaching agent within the range of 3 to 5%. However, if desired, higher concentrations of the aqueous solution of the bleachig agent can be used, and it is possible to effect a desired bleaching by adding the bleaching agent to the water slurry of the cellulose ester in the form of a solid. When the bleaching procedure is employed in a process for producing the cellulose ester, such as that described above for preparing cellulose acetate, it is preferred to effect the desired bleaching by contacting the bleaching agent with the cellulose ester at any point in the process after the precipitation of the cellulose ester by addition of excess water. In actual commercial practice the cellulose ester is given a preliminary washing after precipitation with water, and it is then bleached in a water slurry as already described. However, if desired, the cellulose ester can be prepared as a solid in the manner described above, and at a time subsequent to such preparation an aqueous slurry of the cellulose ester can then be prepared. The cellulose ester in this slurry is then bleached in accordance with this invention. When this bleaching procedure is incorporated in the above process for producing a cellulose ester at a point in the process subsequent to the precipitation of the cellulose ester in water, there is no necessity for adjusting the pH of the mixture since sufficient acetic acid is retained on the precipitated cellulose acetate particles to produce a slurry having a pH within the desired range.

In the above specific examples which are illustrative of this invention, sodium chlorite was used as the bleaching agent. Sodium chlorite is the preferred bleaching agent for this process and it is available commercially. However, other inorganic chlorites, for example, ammonium chlorite, and metallic chlorites, such as the alkali metal and alkaline earth metal chlorites, can be employed in the process. For example, potassium chlorite, calcium chlorite, magnesium chlorite, barium chlorite, and the like, are within the scope of this invention.

In order to demonstrate the utility and desirability of this invention the preferred sodium chlorite bleaching agent was compared with other known bleaching agents for purifying cellulose acetate, and the data observed while making this comparison demonstrate conclusively that the chlorite purification technique offers unique advantages over other bleachig methods. In making this comparison the bleaching of the cellulose acetate with potassium permanganate was effected at a pH of 3 to 6 and a temperature of 25° to 50° C. and the bleaching step was followed by a treatment of the cellulose acetate with sodium bisulfite. The bleaching with hydrogen peroxide was carried out at a pH within the range of 3 to 6 and a temperature of 25° to 80° C. The bleaching of the cellulose acetate with sodium hypochlorite was ammonia-inhibited and it was effected at a pH of 2 to 4 and a temperature within the range of 35° to 85° C. The plastic color values shown in Table 2 are in CSCS units and they are the best slurry bleaches that could be obtained at the above conditions. The cellulose acetate samples employed in obtaining these comparative data are indicated as samples A, C, and D, and the specific properties of these cellulose acetate samples are found in Table 1 as samples A, C, and D, respectively. While making the comparative runs on cellulose acetate bleaching with the various bleaching agents, the following data were observed:

Table 2

COMPARISON OF BLEACHING AGENTS—PLASTIC COLORS OF BLEACHED ACETATES

| Acetate Sample | Bleaching Agent | | | |
|---|---|---|---|---|
| | $NaClO_2$ | $KMnO_4$ | $H_2O_2$ | NaOCl |
| A | 3–5 | 5–6 | | |
| C | 7–9 | 10–13 | 25 | 20 |
| D | 12–13 | 17–18 | | |

The inherent colors of the cellulose acetates bleached by the four methods listed in Table 2 show that the hydrogen peroxide and the sodium hypochlorite methods of bleaching fail to remove all the natural coloring matter present in the cellulose acetate. The potassium permanganate and the sodium chlorite bleaches remove substantially all of the inherent color from the cellulose acetate, but the potassium permanganate bleach attacks the cellulose acetate itself to an extent dependent primarily upon the severity of the reaction conditions. This fact was established by performing a series of potassium permanganate bleaches on wood pulp cellulose acetate shown as sample C in Table 1. In this series of runs the conditions of temperature, reagent concentration, pH and duration of the bleaching operation were varied. Consumption of the potassium permanganate was measured for each run, and the color of the bleached cellulose acetate was observed for each run. It was noted that under no conditions was it possible to obtain a potassium permanganate bleached cellulose acetate as nearly colorless as cellulose acetate bleached with sodium chlorite. In each run employing potassium permanganate as the bleaching agent some damage to the cellulose acetate occurred as a result of the oxidative effect of the potassium permanganate upon the cellulose acetate.

An alternative method of effecting the bleaching process involves the use of chlorine dioxide. An aqueous slurry, containing the cellulose ester and having a pH above 7, is formed, and chlorine dioxide gas is passed into the resulting slurry. The chlorine dioxide is absorbed in the aqueous alkaline system with the formation of a chlorite, and subsequently the system is acidified to the desired pH below 7. The chlorite ion thus formed functions as a bleaching agent for the cellulose ester in the normal manner. When employing this alternative bleaching process, the pH of the alkaline aqueous slurry should not exceed 9 since cellulose esters, such as cellulose acetate, will not ordinarily tolerate a higher pH.

From the above data and description of the invention it appears that inorganic chlorites, and particularly sodium chlorite, are ideal bleaches for cellulose esters. These chlorite bleaching agents readily destroy lignin bodies and other known cellulosic contaminants in the cellulose ester, and the chlorites are incapable of establishing oxidized structures in the cellulose which are thermally sensitive.

From the above disclosure various modifications within the scope of this invention will be apparent to those skilled in the art.

What I claim and desire to protect by Letters Patent is:

1. The method for improving the thermal color stability of a cellulose ester prepared in the presence of a sulfuric acid catalyst and containing combined sulfate groups which comprises forming a water slurry of said sulfate-containing cellulose ester, said slurry containing from 7 to 15% cellulose ester, adjusting the pH of said slurry to within the range of 3 to 6, introducing to said slurry from 0.001 to 0.015 part of an alkali metal chlorite per part of cellulose ester, and bleaching said cellulose ester at a temperature of 75° to 130° C. for a period of 0.5 to 6 hours.

2. The method for improving the thermal color stability of a cellulose acetate prepared in the presence of a sulfuric acid catalyst and containing combined sulfate groups which comprises forming a water slurry of said sulfate-containing cellulose acetate, said slurry containing from 7 to 15% cellulose acetate, adding sufficient acetic acid to said slurry to adjust the pH thereof to within the range of 3 to 6, introducing to said slurry from 0.001 to 0.015 part of sodium chlorite per part of cellulose acetate, and agitating the resulting mixture at a temperature of 75° to 130° C. for a period of 0.5 to 6 hours.

3. In a process for producing a cellulose ester plastic wherein cellulose is esterified with a low molecular weight aliphatic carboxylic acid in the presence of a sulfuric acid catalyst and wherein cellulose ester is precipitated from the reaction mixture by the addition of water, the improvement which comprisse forming a water slurry of said cellulose ester having a pH within the range of 3 to 6, adding to said slurry from 0.001 to 0.015 part of a metal chlorite per part of cellulose ester, and agitating the resulting mixture for a period of 0.5 to 6 hours at a temperature within the range of 75° to 130° C. to bleach said cellulose ester and to improve the thermal color stability of said cellulose ester.

4. The improvement according to claim 3 wherein the metal chlorite is an alkali metal chlorite.

5. In a process for producing a cellulose acetate plastic wherein cellulose is acetylated in a reaction mixture containing cellulose, glacial acetic acid, acetic anhydride, methylene chloride and a sulfuric acid catalyst for the acetylation reaction and wherein cellulose acetate is precipitated from the reaction mixture by the addition of water after removal of methylene chloride by distillation, the improvement which comprises forming an aqueous slurry with the thus-precipitated cellulose acetate, said slurry having a pH within the range of 3 to 6, adding to said slurry from 0.001 to 0.015 part of an alkali metal chlorite per part of cellulose acetate, and agitating the resulting mixture for a period of 0.5 to 6 hours at a temperature within the range of 75° to 130° C. to bleach said cellulose acetate and to improve the thermal color stability of said cellulose acetate.

6. The improvement according to claim 5 wherein the alkali metal chlorite is sodium chlorite.

7. The method for improving the thermal color stability of a cellulose ester prepared in the presence of a sulfuric acid catalyst and containing combined sulfate groups which comprises forming an aqueous alkaline slurry of said sulfate-containing cellulose ester, said slurry containing from 7% to 15% cellulose ester and having a pH above 7 but not above 9, passing chlorine dioxide into said aqueous alkaline slurry to form a chlorite therein, and then adjusting the pH of said slurry to within the range of 3 to 6 and bleaching said cellulose ester in thus-acidified slurry at a temperature of 75° to 130° C. for a period of 0.5 to 6 hours.

References Cited in the file of this patent

UNITED STATES PATENTS

| Number | Name | Date |
|---|---|---|
| 2,194,956 | Taylor | Mar. 26, 1940 |
| 2,430,674 | Hampel | Nov. 11, 1947 |

OTHER REFERENCES

Taylor et al., "Technical Ass'n. Papers," 1940, pp. 251–254.